United States Patent [19]
Joseph

[11] Patent Number: 6,005,255
[45] Date of Patent: Dec. 21, 1999

[54] TIMING SYNCHRONIZATION FOR IMAGE SCANNING

[75] Inventor: Eugene Joseph, Port Jefferson Station, N.Y.

[73] Assignee: Symbol Technologies, Inc., Holtsville, N.Y.

[21] Appl. No.: 08/245,267

[22] Filed: May 18, 1994

[51] Int. Cl.$^6$ .................................................. G01N 21/86
[52] U.S. Cl. ................ 250/548; 235/472.01; 235/462.35
[58] Field of Search .................................. 235/462, 472, 235/462.35, 472.01; 250/557, 548

[56] References Cited

U.S. PATENT DOCUMENTS

| | | | |
|---|---|---|---|
| 2,541,247 | 2/1951 | Herr | 250/557 |
| 2,580,270 | 12/1951 | Badgley | 250/557 |
| 2,971,054 | 2/1961 | Holt, Jr. . | |
| 3,173,000 | 3/1965 | Johnson | 250/557 |
| 3,641,564 | 2/1972 | Fassett | 250/217 X |
| 3,774,014 | 11/1973 | Berler | 235/383 |
| 4,021,664 | 5/1977 | Ormsby | 250/227 |
| 4,034,341 | 7/1977 | Isono | 382/6 X |
| 4,387,297 | 6/1983 | Swartz et al. . | |
| 4,409,470 | 10/1983 | Shepard et al. . | |
| 4,422,065 | 12/1983 | Radomirov | 250/231 X |
| 4,523,093 | 6/1985 | Neumann | 250/234 |
| 4,701,050 | 10/1987 | Oshida | 250/557 |
| 4,701,053 | 10/1987 | Ikenaga | 250/557 |
| 4,727,399 | 2/1988 | Matsumoto | 250/557 |
| 4,816,660 | 3/1989 | Swartz et al. . | |
| 4,822,986 | 4/1989 | Guthmuller | 235/462 |
| 4,874,933 | 10/1989 | Sanner | 235/462 |
| 4,896,026 | 1/1990 | Krichever et al. . | |
| 4,924,078 | 5/1990 | Sant'Anselmo et al. . | |
| 5,028,797 | 7/1991 | Abe et al. | 250/557 |
| 5,052,044 | 9/1991 | Gaborski | 235/462 |
| 5,100,237 | 3/1992 | Wittekoek | 250/557 |
| 5,138,140 | 8/1992 | Siemiatkowski et al. . | |
| 5,243,655 | 9/1993 | Wang . | |
| 5,298,727 | 3/1994 | Spratte | 235/463 |

FOREIGN PATENT DOCUMENTS 0 384 955 A2   9/1990   European Pat. Off. .

*Primary Examiner*—Harold I. Pitts

[57] ABSTRACT

A scanner has a window in its housing through which the scanning beam emerges to impinge upon an indicia to be read. The window is elongate, and adjacent each end, on the inside of the housing, there is a bar code symbol structure. In use, the scanning beam first scans across the symbol structure at one end of the window, then passes through the window to impinge upon the indicia, then scans across the second symbol structure at the other end of the window. Reflected light from the two code symbol structures and from the indicia, are received by a photodetector. The reflected light from the bar code symbol structures on the inside surface of the housing provides locating and timing information which enables the scanner to produce an accurate special reconstruction, in computer memory, of the indicia. In an alternative embodiment, the beam moves in a raster pattern, and there is a further locating/timing/ synchronization bar code symbol structure adjacent a long edge of the window. At least one of the raster lines passes over this bar code symbol structure, thereby obtaining further locating and timing information.

21 Claims, 4 Drawing Sheets

TIMING SYNCHRONIZATION FOR IMAGE SCANNING

BACKGROUND OF THE INVENTION

1. Field of the Invention

The invention relates generally to an apparatus for, and a method of, providing timing, synchronization and locating information during the electro-optical scanning of an indicia such as for example a matrix code or a signature.

2. Description of Related Art

Bar code scanners normally read bar code symbols by very rapidly and repeatedly scanning a light beam, for example from a laser source, across the symbol or bar code symbol structure to be deciphered. Reflected light from the light and dark areas of the bar code is received by the scanner, with the time delays between the resultant received pulses of light being used as the basis of a calculation to determine the special relationship between light and dark areas which are present in the bar code. Because of natural variations in the scanning speed (both between scans and within a single scan), and other unquantifiable variables such as movement of the scanner in the user's hand during the scanning process, some means of location and synchronization is required to ensure that the received series of light pulses can reliably be converted into the proper spatial relationship. This locating and timing or synchronization information is normally built into the bar code symbol. This can be done in many ways, but one convenient possibility is to include a series of special locating, timing or synchronization lines within the bar code symbol structure, spaced apart by a known distance. Receipt of signals from these lines enables the scanner to correct for any non-uniformities in the scanning speed.

Because of their need for locating and timing information, bar code scanners have not widely been used to decode indicia such as signatures which intrinsically contain no locating or timing information. The problem of scanning signatures has been addressed by U.S. Pat. No. 5,138,140, which is in common ownership with the present application. That patent teaches that one can reliably scan a signature with a bar code scanner, provided that the label on which the signature is written also carries a multi-row preamble identification code in front of the signature, and a corresponding postamble code after the signature. In practice, labels are pre-printed with preamble and postamble codes, and the signatory is asked to sign in the space between them. The codes and the signature are then scanned. The timing information provided by the preamble and postamble codes enables the reflected light pulses from the signature to be accurately converted into a digitised special reconstruction of the signature, held in computer memory.

Although effective to achieve its stated purpose, the teaching of the prior art does require the use of relatively expensive pre-printed labels. This not only adds to the cost, but limits the flexibility of the system since to be effectively scanned a signature has to be written precisely in the specified area between the preamble and postamble codes. Signatures of different sizes are not easily catered for, neither is it easy to generalise the system to allow the scanner to read many types of images, of different sizes and orientations.

SUMMARY OF THE INVENTION

Objects of the Invention

It is an object of the present invention at least to alleviate the problems of the prior art.

It is another object to reliably capture nonsynchronised indicia for subsequent retrieval for a wide variety of uses.

It is a further object to provide increased flexibility in the type of indicia that can be captured, their sizes and orientations.

Features of the Invention

According to one aspect of the invention there is provided a scanner for reading indicia comprising:

(a) scanning means for scanning a light beam over a predetermined area, said area covering an indicia to be read;

(b) masking means positioned in the beam intermediate the scanning means and the indicia, and out of the plane of the indicia, the masking means carrying code means; and (c) means for receiving light reflected from the indicia and for reading the indicia using information from the code means.

According to a further aspect of the invention there is provided a method of reading indicia comprising:

(a) scanning a light beam over a predetermined area, said area covering an indicia to be read;

(b) positioning masking means in the beam intermediate the scanning means and the indicia, the masking means being out of the plane of the indicia, and the masking means carrying code means; and (c) receiving light reflected from the indicia and reading the indicia using information from the code means.

In either aforementioned aspect, the code means may comprise locating and/or timing code means and the indicia may be read using locating and/or timing information reflected from the code means.

Broadly stated, the invention comprises scanning a light beam over an indicia to be read, and interposing into the light beam between the scanning means and the indicia a mask which carries code means. Light reflected back from the indicia is collected along with light reflected back from the code means on the mask, and the information, such as locating or timing information, derived from the code means is used to correct for variations in scanning speed as the beam moves across the indicia. Thus, where the scanning beam is produced by a beam of light reflected from an oscillating mirror, corrections can be made for the motor speed which may well vary during the scan. Alternatively, the code means may comprise CCD means which produce electrical signals when the beam impinges upon them. The timing/position information in these electrical signals may be used to assist in the reading or decoding of the indicia.

Preferably, the code means is located on the edge of the masking means so that there is no gap, or only a small gap, between the beam scanning across the code means and subsequently across the indicia. The code means can be located anywhere within the effective scanning area of the beam, with the proviso of course that the masking means must not block light from reaching the indicia. In a preferred embodiment, the code means comprises a first code means portion and a second code means portion, these being positioned on opposite sides of the indicia, in the direction of scanning, so that at least one scan line scans first across the first code means portion, then across the indicia, then across the second code means portion. Alternatively, one could scan from the top or bottom of the window to one or other of the side edges.

In a preferred embodiment, which is particularly suitable for hand-held scanners, the code means comprise one or more bar code symbols which are pasted or otherwise glued to the inside surface of the bar code reader, in a position where they will be scanned by the light beam. Desirably, the bar code symbols may be positioned adjacent to the window through which the light beam emerges.

With such an arrangement, there can be more flexibility as to the size and/or shape of the indicia to be read. If the indicia is relatively large, the bar code scanner can be removed to a greater distance so that the indicia fits neatly between the bar code symbols on either side of the window. This of course assumes that the bar code reader can focus at different distances, but several methods of achieving that can be found in the prior art.

The novel features which are at present considered characteristic of the invention are set forth in the appended claims. The invention itself, however, both as to its construction and its method of operation, together with additional objects and advantages thereof, will be best understood from the following description of specific embodiments when read in conjunction with the accompanying drawings.

DETAILED DESCRIPTION OF THE PREFERRED EMBODIMENTS

Figure 1:
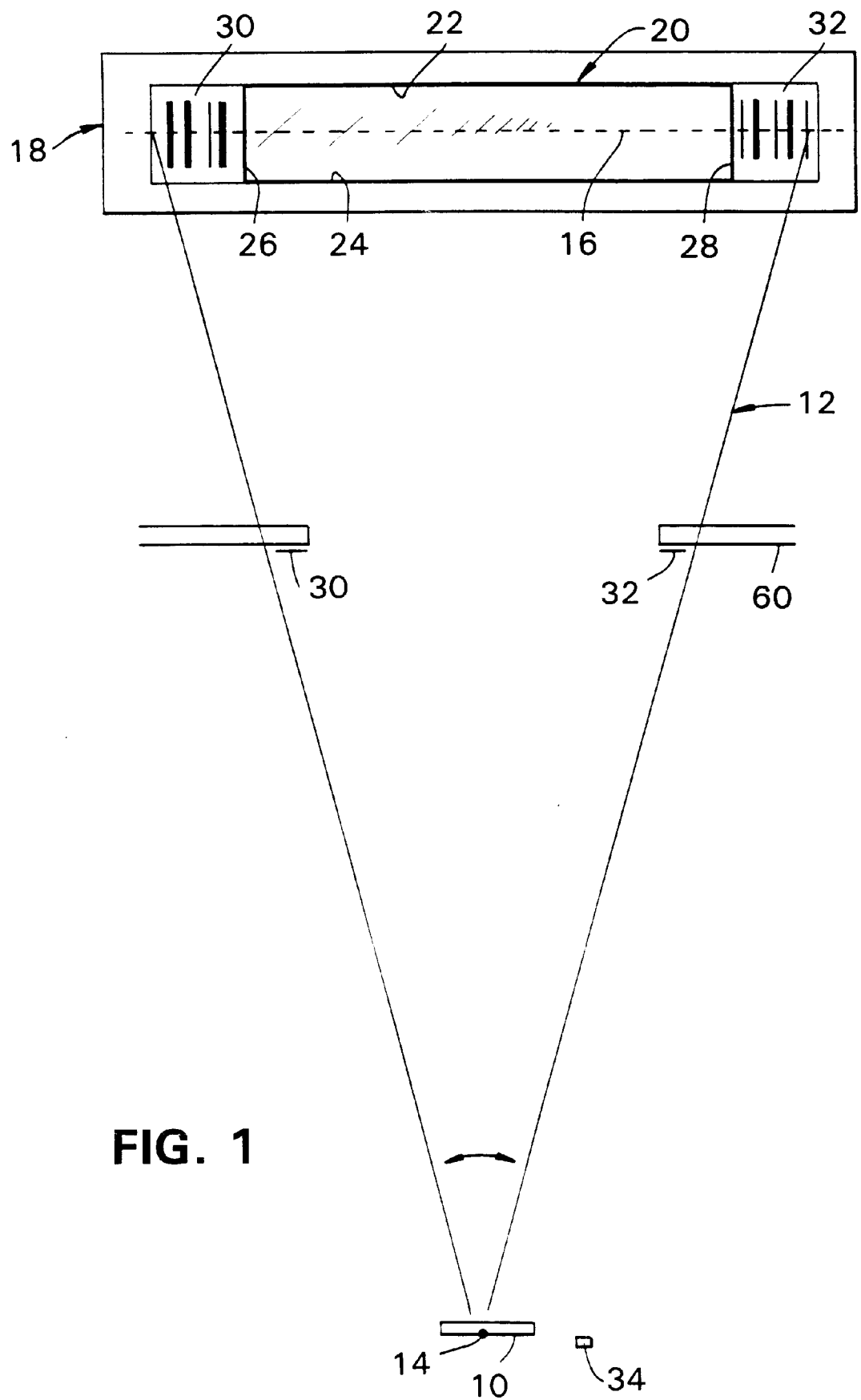
FIG. 1 is a schematic drawing of the inside of a bar code reader, according to a first embodiment of the invention.

FIG. 1 shows schematically the inside of a bar code reader according to a first embodiment of the present invention. Only relevant features of the scanner are shown: the other features may be taken from any known prior art scanner such as are shown in U.S. Pat. Nos. 4,387,297, 4,409,470, 4,816,660 and 4,896,026. The contents of those patents are incorporated herein by reference.

Figure 6:
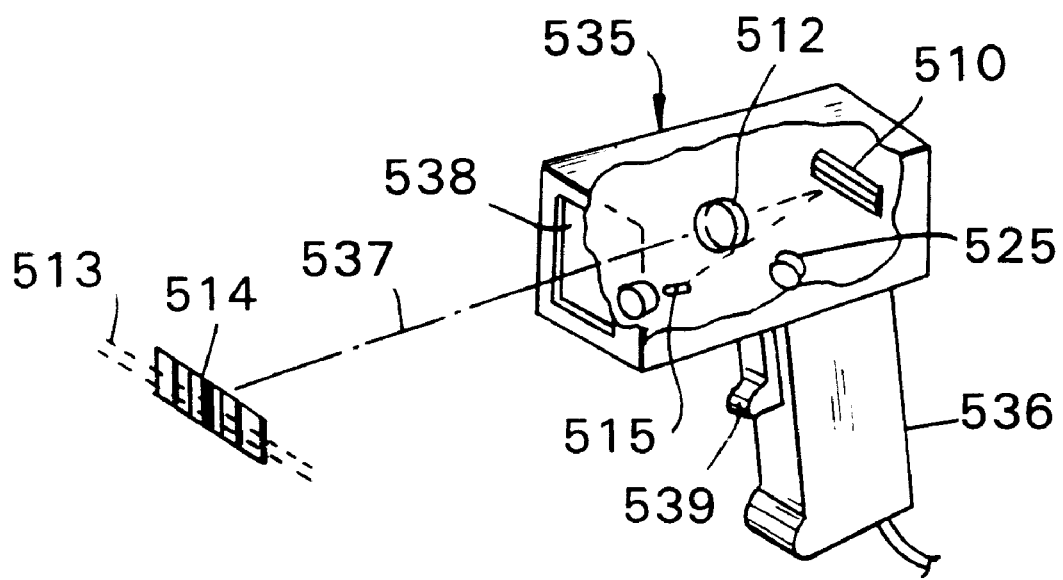
FIG. 6 shows an exemplary hand-held scanner within which the embodiments of FIGS. 1–4 may be incorporated.

FIG. 6 illustrates, as an example, a suitable type of hand-held laser scanner into which the present embodiment can be incorporated. The scanner comprises a main body 535 having a graspable handle portion 536 which carries a trigger 539. Within the body 535, there is a laser 515 which is arranged to shine onto an oscillating mirror 510. The resulting beam 537 passes through a lens 512, and out of the housing via a window 538. The mirror 510 is arranged to oscillate in such a way that the beam 537 traces out a raster scanning pattern 513 across an indicia 514 to be recorded. Light reflected back from the indicia passes through the window 538, through the lens 512 and is reflected back from the mirror 510 to a photodetector 525. The optical signal is then converted into an electrical signal, and the features of the indicia 514 determined.

In the embodiment of FIG. 1, a light beam from a laser source (not shown) is reflected off of an oscillating mirror 10 to produce a scanning light beam generally indicated at 12. The mirror 10 oscillates about an axis 14, perpendicular with the page, so that the light beam repeatedly traces out a scan line 16 which for convenience is shown as dashed in the drawing.

The scan line 16 repeatedly traces out a path on the inside surface 18 of the housing of the scanner. Within the surface 18 there is an elongate window 20 defined by upper and lower edges 22,24 and left and right sides 26,28, through which the beam exits the scanner. As in a conventional scanner, the beam then impinges upon an indicia to be captured. The light reflected from the light and dark areas of the indicia then come back to the scanner and are detected by a photosensor 34 in the conventional way.

To provide locating and timing information, in the event that the indicia to be captured does not include synchronization code symbols, the embodiment of FIG. 1 envisages preamble and postamble locating/timing/synchronization code symbol structures 30,32 being pasted or otherwise secured to the inner surface 18 of the scanner adjacent the ends 26,28 of the window 20. As the mirror 10 oscillates about the axis 14, the beam 12 scans first across the preamble code symbol structure 30, then across the indicia to be captured (via the window 20), then across the postamble code symbol structure 32. These code symbol structures may typically be a quarter of an inch wide (6 mm). Light from the entire length of the scan is reflected back and is received by the photodetector 34, which provides a signal to computing means (not shown) so enabling the scanner to capture and/or decode the indicia making use of the locating/time/synchronization information which is provided by the preamble and postamble code symbol structures.

Figure 2:
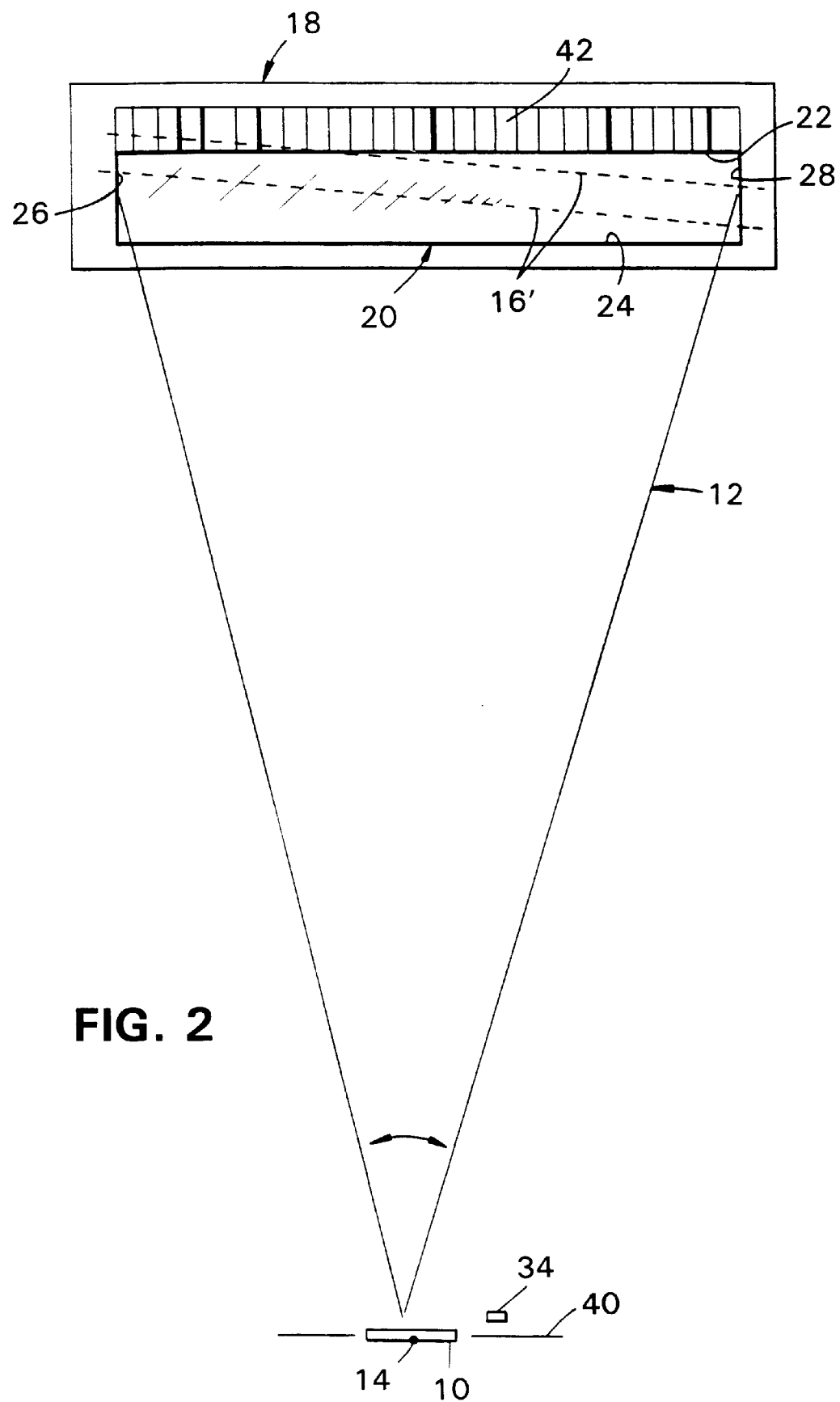
FIG. 2 is a further schematic drawing of the inside of a bar code reader, according to a second embodiment of the invention.

A second embodiment of the present invention is shown schematically in FIG. 2. Features which correspond to those already described with reference to FIG. 1 have the same reference numeral.

In this embodiment, the mirror 10 oscillates not only about the axis 14 but about an orthogonal axis 40, so that the scanning path 16' becomes a raster, as is indicated by the parallel dotted line.

Locating/synchronization/timing information is provided by an upper code symbol structure 42 which is pasted or otherwise secured to the inner surface 18 of the scanner housing immediately above the window 20. As the raster scan proceeds, the scanning path takes in the code symbol structure 42 before moving on to cover the indicia to be collected, via the window 20. Reflected light from both the timing code symbol structure 42 and the indicia is received by the photodetector 34. The locating/synchronization/timing information provided by the code symbol structure 42 enables the pulses of light received from the indicia to be properly calibrated and converted into a digital spatial representation of the indicia, held in memory.

Figure 3:
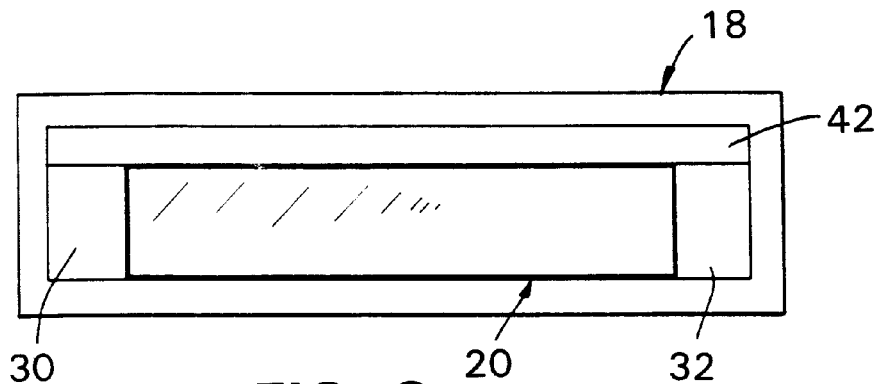
FIG. 3 shows an alternative arrangement of codes.

In a further embodiment, shown in FIG. 3, the upper code 42 is used in conjunction with the preamble and postamble code symbol structures 30,32 of FIG. 1.

Figure 4:
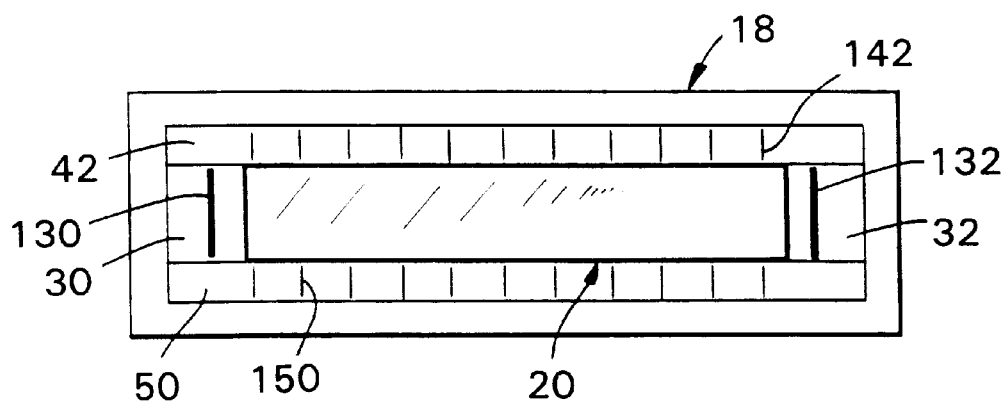
FIG. 4 shows yet another arrangement of codes.

In yet a further embodiment, shown in FIG. 4, a lower locating/timing/synchronization code symbol structure 50 is used along with the upper code symbol structure 42 and the preamble and postamble code symbol structures 30,32.

FIG. 4 shows more clearly a specific preferred embodiment for the upper and lower locating/timing/synchronization code symbol structures, and the preamble and postamble code symbol structures. As may be seen in the Figure, the upper and lower locating/timing/synchronization code symbol structures 42,50 comprise respective upper and lower speed compensation gratings 142,150, each of which consists of a series of equally spaced timing bars. The preamble and postamble code symbol structures comprise respective guard bars 130,132. In use, the laser beam scans both above and below and to the left and right of the scanning window. The speed compensation gratings act to provide timing information, and thus provide information on the speed profile of the scanning laser beam. The waveform corresponding to each scan across the window contains two valleys which indicate the position of the guide bars. These valleys are present on all of the scan lines that cross the scanning window, and may be used to align adjacent scan lines.

Figure 5:
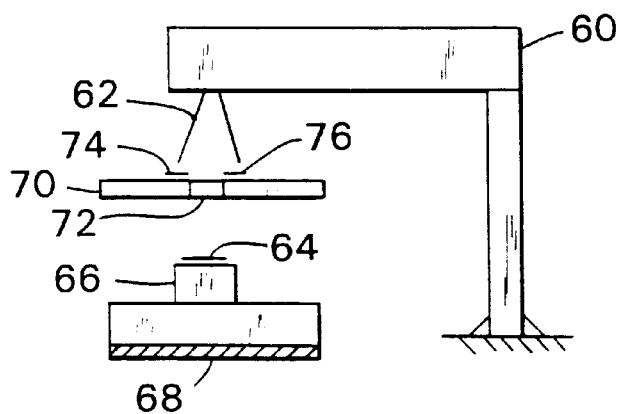
FIG. 5 shows another embodiment in which the masking means is separate from the housing of the scanner.

It will of course be appreciated that the guide bars and speed compensation gratings shown in FIG. 4 are equally applicable to the embodiments of FIGS. 1 to 3, as well as to the alternative arrangement shown in FIG. 5.

In any of the embodiments so far discussed, the locating/timing/synchronization code symbol structures are preferably printed onto strips of paper which are then pasted or otherwise glued to the inner surface 18 of the scanner body, adjacent to the window 20. However, it is also envisaged that the code symbol structures could be directly printed onto the surface 18. It is of course not necessary for the code symbol structures to be exactly co-planar with the window 20, provided that they are so positioned as to be read by the scanning light beam. Accordingly, instead of the preamble and postamble code symbol structures 30,32 being pasted immediately adjacent the window they could instead be positioned on some other part 60 of the scanner housing, as is shown in FIG. 1, provided that that part sufficiently projects into the scanning area of the beam so that the code symbol structures will be read. The upper and/or lower code symbol structures 42,50 could likewise be positioned on some other part of the housing (not shown) which is so positioned as to be illuminated by the raster beam. In a further development of the invention, it is not even necessary for the locating/timing/synchronization code symbol structures to be contained within the housing of the scanner. FIG. 5 shows an arrangement in which a fixed scanner 60 uses a scanning beam 62 to capture an indicia 64 on a product 66 which is being moved past the scanner on a conveyor belt 68. Interposed between the scanner 60 and the product 66 is a mask 70 having a window 72. Adjacent the window, and within the area scanned by the beam 62, are first and second locating/timing/synchronization code symbol structures 74,76. These code symbol structures could be positioned either on two, three or four sides of the window 72 as has already previously been described with reference to FIGS. 1 to 4. Depending upon the size of the indicia 64 to be captured, the mask 70 can be moved upwardly or downwardly, so that as seen from the scanner the indicia always appears to take up most of the area of the window.

In all of the embodiments, the indicia to be captured can be any appropriate type of image that does not contain its own embedded synchronization information. Suitable examples for the embodiments of FIGS. 2 and 5 include matrix code symbols, signatures, logos, and indeed any other type of two-dimensional image.

It will be understood that each of the elements described above, or two or more together, also may find a useful application in other types of constructions differing from the types described above.

The beam 12 is preferably a scanning laser beam, although other types of scanning beam also fall within the ambit of the invention. The invention also encompasses the use of a CCD imager. With such an arrangement the structures 30,32 in FIG. 1 become CCD imagers rather than code symbol structures. When light falls upon the CCD imagers 30,32 they provide electrical signals (not shown) which provide an indication of exactly when the light beam reaches each of the imagers. Likewise, in FIG. 2 the upper structure 42 could be a CCD imager.

While the invention has been illustrated and described with reference to various particular embodiments, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim:

1. A scanner for reading indicia comprising:
   (a) scanning means for scanning a light beam over a predetermined area, said area covering an indicia to be read;
   (b) masking means positioned in the beam intermediate the scanning means and the indicia, and out of the plane of the indicia, the masking means carrying at least one coded symbol; and
   (c) means for receiving light reflected from the indicia and for reading the indicia using information from the at least one coded symbol.

2. A scanner as claimed in claim 1 wherein the at least one coded symbol comprises at least one bar code symbol.

3. A scanner as claimed in claim 1 wherein the at least one coded symbol comprises a timing code.

4. A scanner as claimed in claim 3 wherein the at least one coded symbol comprises a speed compensation grating.

5. A scanner as claimed in claim 1 wherein the at least one coded symbol comprises a first code portion to one side of the indicia and a second code portion to an opposite side of the indicia, whereby the beam scans first across the first code portion, then across the indicia, then across the second code portion.

6. A scanner as claimed in claim 5 wherein at least one of the first and second code portions comprises a guard bar.

7. A scanner as claimed in claim 1 wherein the scanning means produces a raster scan, the at least one coded symbol comprising an elongate code symbol structure which is scanned by one or more raster lines before subsequent raster lines scan across the indicia.

8. A scanner as claimed in claim 7 wherein the at least one coded symbol further includes a first code symbol structure to one side of the indicia and a second code symbol structure to an opposite side of the indicia, whereby at least one line of the raster scan scans the elongate code symbol structure, and at least one subsequent line of the raster scan scans first across the first code symbol structure, then across the indicia, then across the second code symbol structure.

9. A scanner as claimed in claim 8 wherein a further elongate code symbol structure is provided on an opposite side of the indicia from the said elongate code symbol structure, at least one raster scan line being arranged to scan across said further elongate code symbol structure after the indicia has been scanned.

10. A scanner as claimed in claim 8 wherein the first and second code symbol structures comprise guard bars and the elongate code symbol structure comprises a speed compensation grating.

11. A scanner as claimed in claim 1 having a housing and a window in the housing through which the beam passes to impinge upon the indicia, the masking means comprising those parts of the housing which define the window, and the at least one coded symbol being located on a surface of the housing adjacent to the window.

12. A scanner as claimed in claim 11 wherein the window is generally rectangular and is defined by an upper edge, a lower edge, a first side edge and a second side edge, the beam scanning across the window from the first side edge to the second side edge, and the at least one coded symbol comprises a first code portion adjacent the first side edge and a second code portion adjacent the second side edge.

13. A scanner as claimed in claim 11 wherein the window is generally rectangular and is defined by an upper edge, a lower edge, a first side edge and a second side edge, the beam scanning in a raster fashion in a series of generally parallel lines, the at least one coded symbol comprising an elongate code symbol structure adjacent the upper edge of the window, a first code portion adjacent the first side edge and a second code portion adjacent the second side edge, wherein at least one raster line scans across the elongate code symbol structure, and at least one subsequent raster line scans first across the first code portion, then across the window, and then across the second code portion.

14. A scanner as claimed in claim 13 wherein the first and second code symbol structures comprise guard bars and the elongate code symbol structure comprises a speed compensation grating.

15. A scanner as claimed in claim 14 wherein a further elongate code symbol structure is provided adjacent the lower edge of the window, at least one raster line scanning across said further elongate code symbol structure after said window has been scanned.

16. A scanner as claimed in claim 11 in which the window is generally rectangular and is defined by an upper edge, a lower edge, a first side and a second side edge, the beam scanning in a raster fashion in a series of generally parallel lines, the at least one coded symbol comprising an elongate code symbol structure adjacent the upper edge of the window, the elongate code symbol structure being read by one or more raster lines before subsequent raster lines scan across the window.

17. A scanner as claimed in claim 1 wherein the means for reading the indicia uses light reflected from the at least one coded symbol.

18. A scanner for reading indicia comprising:

(a) scanning means for scanning a light beam over a predetermined area, said area covering an indicia to be read;

(b) masking means positioned in the beam intermediate the scanning means and the indicia, and out of the plane of the indicia, the masking means carrying at least one CCD; and (c) means for receiving light reflected from the indicia and for reading the indicia using information from the at least one CCD.

19. A scanner as claimed in claim 18 wherein the CCD is arranged to produce an electrical signal, said electrical signal providing information which is used to read the indicia.

20. A method of reading indicia comprising:

(a) scanning a light beam over a predetermined area, said area covering an indicia to be read;

(b) positioning masking means in the beam intermediate the scanning means and the indicia, the masking means being out of the plane of the indicia, and the masking means carrying at least one coded symbol; and (c) receiving light reflected from the indicia and reading the indicia using information from the at least one coded symbol.

21. A scanner as claimed in claim 11 wherein the window is generally rectangular and is defined by an upper edge, a lower edge, a first side edge and a second side edge, the beam scanning at least between said upper edge and one of said side edges or between said lower edge and one of said side edges.

* * * * *

UNITED STATES PATENT AND TRADEMARK OFFICE
CERTIFICATE OF CORRECTION

PATENT NO. : 6,005,255
DATED : December 21, 1999
INVENTOR(S) : Eugene Joseph

It is certified that error appears in the above-identified patent and that said Letters Patent is hereby corrected as shown below:

Title page,
Item [57], ABSTRACT,
Line 16, "special" should be -- spacial --.

Column 1,
Lines 18 and 50, "special" should be -- spacial --.

Column 6,
Line 18, "letters patent" should be -- Letters Patent --.

Signed and Sealed this

Twelfth Day of March, 2002

*Attest:*

JAMES E. ROGAN
*Attesting Officer*  *Director of the United States Patent and Trademark Office*